United States Patent [19]
Webb et al.

[11] Patent Number: 5,916,997
[45] Date of Patent: Jun. 29, 1999

[54] WEATHERABLE COPOLYMERS

[75] Inventors: Jimmy Lynn Webb, Ballston Lake; Randall Lee Carter, Clifton Park; Tiberiu Mircca Siclovan, Schenectady; Matthew Hal Littlejohn, Green Island; James Edward Pickett, Niskayuna, all of N.Y.

[73] Assignee: General Electric Company, Schenectady, N.Y.

[21] Appl. No.: 09/030,076

[22] Filed: Feb. 25, 1998

[51] Int. Cl.$^6$ ..................................................... C08G 63/18
[52] U.S. Cl. ......................... 528/194; 528/176; 528/193; 528/206; 528/298; 528/302; 528/307; 528/308; 528/308.6
[58] Field of Search ...................... 528/176, 193, 528/194, 206, 298, 302, 307, 308, 308.6

[56] References Cited

U.S. PATENT DOCUMENTS

| | | |
|---|---|---|
| 3,444,129 | 5/1969 | Young, Jr. et al. . |
| 3,919,234 | 11/1975 | Ramey et al. . |
| 3,920,659 | 11/1975 | Ramey et al. . |
| 4,190,571 | 2/1980 | Lai et al. . |
| 4,208,522 | 6/1980 | Ramey et al. . |
| 4,292,240 | 9/1981 | Lai et al. . |
| 4,480,092 | 10/1984 | Lai et al. . |
| 4,525,504 | 6/1985 | Morris et al. . |
| 5,071,981 | 12/1991 | Son et al. . |

OTHER PUBLICATIONS

"Transparent Ultraviolet–Barrier Coatings," SM Cohen, H Young, AH Markhart; Journal of Polymer Science, Part A–1, vol. 9, 3263–3299 (1971).

*Primary Examiner*—Samuel A. Acquah
*Attorney, Agent, or Firm*—Noreen C. Johnson; Douglas E. Stoner

[57] ABSTRACT

Disclosed are weatherable polyester soft block copolymer compositions comprising copolymers of resorcinol or alternatively phenol, aromatic dicarboxylic acid, and a aliphatic dicarboxylic acid based structural units. These polyester soft block copolymers comprise a substantial proportion of direct linkages between the resorcinol or alternatively the phenol, and the aromatic dicarboxylic acid based structural units, the balance of the linkages being between resorcinol and the aliphatic dicarboxylic acid based structural units.

18 Claims, No Drawings

WEATHERABLE COPOLYMERS

FIELD OF INVENTION

The instant invention relates to a weatherable soft block copolymer composition.

BACKGROUND OF THE INVENTION

Most polymers are known to degrade upon prolonged exposure to sunlight or other forms of light. One of the effects observed is yellowing of the polymer or its blends. This problem has been partially alleviated by the use of light absorbers or light blockers which restrict the penetration of light and thus minimize the degradation to the polymer surface. Thus ultraviolet light absorbers (UVA) are known to be used to protect polymers from degradation due to exposure to different sources of light.

Use of UVA's, however, does not offer complete protection as degradation still occurs at the surface and ultimately leads to discoloration and surface embrittlement, albeit at a reduced rate. The life time of many polymers in a weathering environment may be prolonged by increasing the UVA loading, however a practical limit is eventually reached above which the physical properties of the polymer begin to deteriorate with further addition of UVA's. While high loading of UVA's may offer enhanced protection, depending on the application, they can also result in high initial color.

One strategy to protect light induced polymer degradation involves the use of latent UVA's in the form of aromatic polyarylates. When exposed to ultraviolet light, these compositions undergo the photo-Fries rearrangement to generate substituted 2-hydroxybenzophenone moieties which act as UV absorbers as reported by S. B. Maerov in J. Polym. Sci. Part A, Vol. 3, pp. 487–499, 1965, and protect the compositions from further degradation. These polyarylates generally are based on esters of bis phenols, such as bisphenol A, with isophthalic acid and terephthalic acid and have outstanding retention of physical properties upon weathering. An example of such a polyarylate is Ardel® D-100 available from Union Carbide. However, the 2-hydroxybenzophenone moieties generated from such polymers are very yellow and are undesirable in applications that require little change in color during weathering.

Attempts have been made to avoid color formation by substituting resorcinol for the bis phenol unit in the polyarylates, as reported by S. M. Cohen, R. H. Young, and A. H. Markhart in J. Polym. Sci. Part A-1, Vol. 9, pp. 3263–3299, 1971. While using resorcinol results in much lower color upon irradiation, polymers based on poly(resorcinol terephthalate) or poly(resorcinol isophthalate) are reported to have poor solubility and are difficult to synthesize to high molecular weight by conventional interfacial or solution processes due to the formation of highly crystalline oligomers. On addition, the glass transition temperatures of such compositions need to be high, preferably greater than about 100° C., so that the polymers can be used in engineering thermoplastic applications. U.S. Pat. No. 4,390,683 discloses a monoaxially or biaxially stretched film structure, or a heat-set structure thereof, for an unstretched film of an aromatic polyester of the poly-1,3-phenylene terephthalate type. This patent, however, does not report the initial color or weatherability of the stretched film structures.

There is thus a need for high molecular weight polyarylate polymer compositions which can be easily prepared in high yield, and exhibit little change in color upon irradiation. There is also a continued need for polymers that when exposed to light do not lose the desirable physical properties of the polymer.

SUMMARY OF THE INVENTION

The present invention provides a weatherable polyester soft block copolymer composition comprising structural units of Formulas A, B, and C:

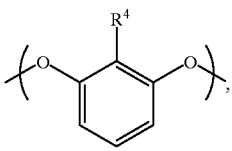

Formula A

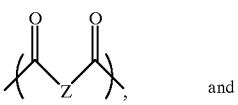

Formula B and

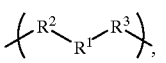

Formula C wherein $R^1$ represents $C_{3-20}$ straight chain alkylene, $C_{3-10}$ branched alkylene, or $C_{4-10}$ cyclo or bicycloalkylene;

$R^2$ represents

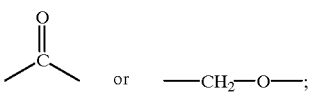

$R^3$ represents

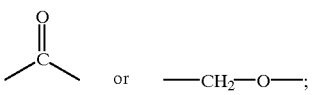

$R^4$ represents H, $C_{1-8}$ straight chain alkyl, or $C_{4-8}$ branched alkyl; and Z represents at least one of 1,3-phenylene, 1,4-phenylene, and 2,6-naphthylene;

wherein Formula B comprises at least about 40 mole percent 1,3-phenylene, and Formula C contributes from about 1 to about 45 mole percent to ester linkages of the polyester.

The term soft block copolymers as used herein, indicates that some segments of the polymers are made from non aromatic monomer units. Such non aromatic monomer units are generally aliphatic and are known to impart flexibility to the soft block polymers. Also chemical moieties within a bracket ─(─)─ represent repeating structural units that contribute to the polyester soft block polymer of this invention.

DETAILED DESCRIPTION OF THE INVENTION

In one embodiment of the present invention is provided a composition wherein Z comprises at least about 50 mole percent 1,3-phenylene. Another embodiment provides a composition wherein $R^1$ represents $C_{3-14}$ straight chain alkylene, or $C_{5-6}$ cycloalkylene, and a preferred composition being one wherein $R^1$ represents $C_6$-cycloalkylene or $C_{3-10}$ straight chain alkylene.

Additional embodiments of the present invention provide a composition wherein Formula C contributes from about 5 to about 40 mole percent to the ester linkages of the polyester, with about 5 to about 20 mole percent being particularly preferred.

Another aspect of the present invention provides a weatherable polyester soft block copolymer composition comprising structural units of Formula D, and optionally comprising structural units of Formulas E and F:

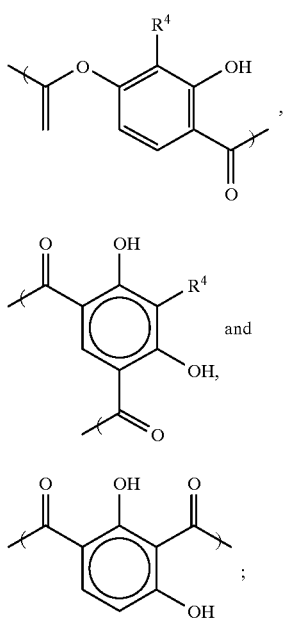

Formula D

Formula E

Formula F wherein $R^4$ is as previously defined.

Compositions comprising structural units represented by Formulas A, B, C, D, E, and F can be prepared by exposing compositions comprising structural units represented by Formulas A, B, and C to light. These compositions undergo the Fries rearrangement wherein structural units represented by Formula A are at least partially converted to structural units represented by Formula D. The Fries rearrangement, for example, converts an aromatic ester in to an hydroxy benzophenone. The Fries rearrangement can also convert structural units represented by Formula A to Formula E, and Formula F. It should be noted that the Fries rearrangement can also occur under thermal conditions, as is known to one skilled in the art.

Still yet another embodiment of the present invention provides compositions comprising structural units represented by Formulas A, B, C, and D, wherein the molar ratio of structural units represented by Formula A to structural units represented by Formula ID ranges from about 99:1 to about 1:1. Another embodiment provides a composition wherein the molar ratio of structural units represented by Formula A to the structural unit represented by Formula D is from about 99:1 to about 80:20. A preferred embodiment provides a composition wherein Z comprises a monocyclic aromatic ring, in which at least 40 mole percent of the monocyclic aromatic ring is 1,3-phenylene, with the remainder being 1,4-phenylene.

Other embodiments where the polyester composition comprises structural units of Formula D and optionally Formulas E and F, provide a formulation wherein $R^1$, in Formula C, represents $C_{3-14}$ straight chain alkylene or $C_{5-6}$ cyclo alkylene, a particularly preferred composition being one wherein $R^1$ represents $C_6$-cycloalkylene, or $C_{3-10}$ straight chain alkylene.

EXPERIMENTAL DETAILS

The compositions claimed in the present invention can be prepared by interfacial polycondensation, melt polycondensation, solid state polymerization, or other procedures known to one skilled in the art.

Procedure A

Aliphatic diacid used as the soft block:

To a 1 liter, 4 neck flask, equipped with a mechanical stirrer, nitrogen inlet, reflux condenser, and two pressure equilibration addition funnels, were added cetyl trimethyl ammonium bromide (1.82 g, 5.00 mmole), freshly distilled resorcinol (11.01 g, 100 mmole), p cumylphenol, (28.2–212 mg, 0.25–1 mole percent) as a chain stopper, and degassed dichloromethane (150 mili liters). The flask was blanketed with nitrogen. One of the addition funnels was charged with sodium hydroxide (NaOH) pellets (8.04 g, 200 mmole), and water (50 mili liters). The aqueous sodium hydroxide solution was cooled while nitrogen was bubbled through the solution for 5 minutes. Isophthaloyl chloride (18.27 g, 90 mmole), sebacoyl chloride (2.41 g, 10.08 mmole), and dichloromethane (100 mili liters), were added to the second addition funnel and the resulting acid chloride mixture was degassed for 5 minutes. Benzoyl chloride (0.25–1 mole percent) can be added to the acid chloride mixture instead of p-cumylphenol to serve as a chain stopper. The cold (20° C.) sodium hydroxide solution was added to the contents of the flask, under stirring at a rate which prevented refluxing of the solvent, leading to the formation of a white-translucent emulsion. The mixture of the acid chlorides was then added to the white-translucent emulsion at a rate so as to maintain a gentle reflux while preventing any azeotrope from contaminating the acid chloride solution. The white emulsion was stirred at room temperature for one hour and the polymer thus formed was precipitated in cold (20° C.) methanol, washed with water, washed with methanol, and dried in vacuum to yield 26.6 g, 95 mole percent of a white, fibrous polymeric material.

Gel Permeation Chromatography (GPC) analysis (using chloroform/2 volume percent isopropanol) showed a bimodal distribution, with a peak molecular weight between about 200,000 and about 30,000, depending on the amount of chain stopper used, and a second peak centered at about 1,200. A polymer exhibiting a unimodal molecular weight distribution can be obtained by heating the while fibrous polymeric material for 5 minutes at 250° C.

Procedure B

Aliphatic diol used as soft block:

To a 1 liter 4 neck flask, equipped with a mechanical stirrer, nitrogen inlet, reflux condenser and two pressure equilibration addition funnels, were added cetyl trimethyl ammonium bromide (1.640g, 4.50 mmole), and resorcinol (9.910 g, 90 mmole). The flask was blanketed with nitrogen. One of the addition funnels was charged with 50 mili liters dry dichloromethane, hexane diol (10 mmole) and dry triethylamine (3 ml, 22 mmole). A solution of isophthaloyl chloride (20.302 g, 100 mmole) in 50 mili liters dry dichloromethane was then added to the above addition funnel and the resulting yellowish mixture was stirred occasionally under a dry nitrogen atmosphere. Meanwhile, the second addition funnel was charged with a solution of sodium hydroxide (7.2 g, 185 mmole), in deionized water (45 mili liters). This aqueous sodium hydroxide solution was degassed by bubbling nitrogen. Upon the disappearance of the yellow color initially formed in the acid chloride containing funnel, but not sooner than 30 minutes after the acid chloride (isophthaloyl chloride) addition, the flask containing cetyl trimethyl ammonium bromide and resorcinol was charged with dichloromethane (150 mili liters). While stirring, the aqueous sodium hydroxide solution was added to the contents of the flask. A white, translucent emulsion formed. The acid chloride containing solution was then added to the white translucent emulsion at such a rate as to result in only a moderate reflux, changing the translucent emulsion into an opaque polymer emulsion. The white, opaque emulsion was further stirred at room temperature for one hour. The polymer thus obtained was worked up under the same conditions used for the typical interfacial polycondensation described previously.

Procedure C
Aliphatic ω-hydroxycarboxylic acid used as the soft block:
To a dry 100 mili liters three neck flask, equipped with a reflux condenser, magnetic stirrer and a Teflon-lined septum, were added isophthaloyl chloride (18.272 g, 90 mmole) and the ω-hydroxydodecanoic acid (10 mmole). The mixture was kept at 85–90° C. for half hour, during which time a homogeneous solution formed and gaseous hydrochloric acid was evolved. Thionyl chloride (1.5 mili liters, 22 mmole) was then added to the mixture and the mixture was further stirred at this temperature for half hour. Vacuum was then applied in order to remove excess thionyl chloride as well as the hydrochloric acid gas. Degassing was stopped upon reaching the boiling point of isophthaloyl chloride. The mixture was cooled under dry nitrogen and transferred to a dry pressure equilibration addition funnel as a solution in dry dichloromethane (100 mili liters).

Polymerization was conducted as described under Procedure 1 for the typical interfacial procedure, using cetyl trimethyl ammonium bromide (1.640 g, 4.5 mmole) and resorcinol (9.910 g, 90 mmole) in dichloromethane (140 mili liters) and sodium hydroxide (7.20 g, 185 mmole) in deionized water (45 mili liters). The polymer thus obtained was worked up as described before for the typical interfacial process.

Tetrabutyl ammonium halide can be substituted for cetyl trimethyl ammonium bromide in the above procedures. Other tetraalkyl ammonium halide phase transfer agents known to one skilled in the art can also be used. The alkyl group typically represents $C_{1-16}$ alkyl.

Tables 1A and 1B list the different compositions made by the general procedures outlined above.

TABLE 1A

Dicarboxylate softblocks.
Diol is resorcinol in all cases (except for Entry 27).

| Entry # | % iso-phthalate | % hardblock #2 | % softblock | peak mol. wt. | Tg |
|---|---|---|---|---|---|
| 1 | 100 | 0 | 0 | precipitated during rxn. | |
| 2 | 90 | 0 | 10 sebacate | 91500 | 116 |
| 3 | 80 | 0 | 20 sebacate | 122500 | 99 |
| 4 | 70 | 0 | 30 sebacate | 143500 | 78 |
| 5 | 60 | 0 | 40 sebacate | 78500 | 59 |
| 6 | 50 | 0 | 50 sebacate | 95500 | 44 |
| 7 | 90 | 0 | 10 1,4-cyclohexane-dicarboxylate | 504000 | 143 |
| 8 | 80 | 0 | 20 1,4-cyclohexane-dicarboxylate | 79500 | 130 |
| 9 | 70 | 0 | 30 1,4-cyclohexane-dicarboxylate | 37000 | 129 |
| 10 | 60 | 0 | 40 1,4-cyclohexane-dicarboxylate | 56000 | 126 |
| 11 | 50 | 0 | 50 1,4-cyclohexane-dicarboxylate | 107000 | 122 |
| 12 | 80 | 10 terephthalate | 10 sebacate | 45000 | 120 |
| 13 | 70 | 20 terephthalate | 10 sebacate | 45000 | 120 |
| 14 | 60 | 30 terephthalate | 10 sebacate | 89500 | 121 |
| 15 | 50 | 40 terephthalate | 10 sebacate | 55000 | 120 |
| 16 | 50 | 48 terephthalate | 2 sebacate | 158000 | 142 |
| 17 | 50 | 45 terephthalate | 5 sebacate | 63000 | 131 |
| 18 | 40 | 50 terephthalate | 10 sebacate | 125500 | 123 |
| 19 | 30 | 60 terephthalate | 10 sebacate | 91500 | 126 |
| 20 | 0 | 90 terephthalate | 10 sebacate | 31500 | 130** |
| 21 | 80 | 10 2,6-naphthalene-dicarboxylate | 10 sebacate | 63500 | 122 |
| 22 | 70 | 20 2,6-naphthalene-dicarboxylate | 10 sebacate | 57000 | 123 |
| 23 | 60 | 30 2,6-naphthalene-dicarboxylate | 10 sebacate | 112000 | 133 |
| 24 | 50 | 40 2,6-naphthalene-dicarboxylate | 10 sebacate | 145500 | 139 |
| 25 | 40 | 50 2,6-naphthalene-dicatboxylate | 10 sebacate | 373000 | 145 |
| 26 | 10 | 80 2,6-naphthalene-dicarboxylate | 10 sebacate | precipitated during rxn. | |
| 28* | 90 | 0 | 10 sebacate | 81750 | 135 |

*used 2-methyl resorcinol instead of resorcinol.
**Polymer also exhibited a melting point of 278° C.

TABLE 1B

Diol and acid-alcohol softblocks.

| Entry # | % iso-phthalate | % re-sorcinol | % softblock | peak mol. wt. | Tg (° C.) |
|---|---|---|---|---|---|
| 28 | 100 | 90 | 10 1,6-hexanediol | 81,500 | 136 |
| 29 | 100 | 90 | 10 1,10-decanediol | 52,750 | 119 |
| 30 | 100 | 90 | 10 1,4-cyclohexane-dimethanol | 82,500 | 125 |
| 31 | 95 | 95 | 10 12-hydroxy-dodecanoate | 42,300 | 113 |

Physical Properties and Weatherability

Outlined in Table 1A are the glass transition temperatures (Tg) for a series of polymers with varying ratios of aliphatic soft blocks. The Tg of the copolymer may be controlled by the identity and concentration of the soft block moiety, thereby yielding copolymers that are easily melt processed without introducing the undesirable property of high color formation upon weathering, as indicated by a YI value of equal to or less than half compared to the YI value of the Reference in Table 2.

Weatherability

The superior color retention of the compositions presently claimed may be demonstrated by observing the color formation in thin films exposed to accelerated weathering conditions. Films approximately 60 microns thick were formed by compression molding samples of representative compositions. All compositions gave strong, essentially transparent, and colorless films. These films were exposed in an Atlas Ci35a xenon arc Weatherometer® equipped with borosilicate inner and outer filters. The light cycle was 160 minutes long at an irradiance of 0.77 Watts per square meter (W/m$^2$) at 340 nano meters with a black panel temperature of 70° C. and a dry bulb temperature of 45° C. The dark cycle was 20 minutes long with a water spray during the latter 15 minutes. Exposure was measured in total kilojoules per square meter (kJ/m$^2$) of irradiance at 340 nano meters. The transmission color was determined as the yellowness index (YI), measured according to ASTM D1925, on a Gardner XL-835 colorimeter. The changes in YI after 713 kJ/m$^2$ of exposure are shown in Table 2. By this amount of exposure the color shifts have reached a nearly constant value.

TABLE 2

| Entry | Initial YI | Delta YI after 713 kJ/m$^2$ exposure |
| --- | --- | --- |
| Reference* | 1.4 | 12.6 |
| 2 | 2.6 | 3.3 |
| 7 | 6.5 | 4.9 |
| 18 | 3.4 | 3.9 |
| 21 | 3.5 | 6.3 |

*Ardel ® D-100: bisphenol A iso/terephthalate

The above data show that the color shifts of the soft-block containing resorcinol-based polyarylates, Examples 2, 7, 18, and 21, are clearly less than the commercial Ardel® polyarylate based on bisphenol A, the reference sample.

We claim:

1. A weatherable polyester soft block copolymer composition comprising structural units of Formulas A, B, and C:

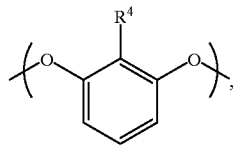

Formula A

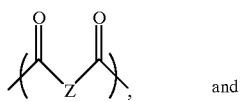

Formula B

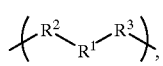

Formula C wherein R$^1$ represents C$_{3-20}$ straight chain alkylene, C$_{3-10}$ branched alkylene, or C$_{4-10}$ cyclo or bicyclo alkylene;

R$^2$ represents

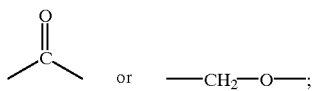

or —CH$_2$—O—;

R$^3$ represents

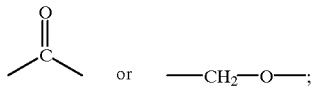

or —CH$_2$—O—;

R$^4$ represents H, C$_{1-8}$ straight chain alkyl, or C$_{4-8}$ branched alkyl; and Z represents at least one of 1,3-phenylene, 1,4-phenylene, and 2,6-naphthylene;

wherein Formula B comprises at least about 40 mole percent 1,3-phenylene, and Formula C contributes from about 1 to about 45 mole percent to ester linkages of the polyester.

2. A composition of claim 1 wherein Formula C contributes from about 5 to about 40 mole percent to the ester linkages of the polyester.

3. A composition of claim 2 wherein Formula C contributes from about 5 to about 30 mole percent to the ester linkages.

4. A composition of claim 1 wherein Formula B comprises at least about 50 mole % 1,3-phenylene.

5. A composition of claim 1 wherein R$^1$ represents C$_{3-10}$ straight chain alkylene, or C$_5$–C$_6$ cyclo alkylene.

6. A composition of claim 5 wherein R$^1$ represents C$_6$-cyclo alkylene.

7. A composition of claim 1 wherein at least 40 mole percent of Formula B comprises 1,3-phenylene, and the remaining being 1,4-phenylene.

8. A composition of claim 5 wherein R$^1$ represents C$_{3-10}$ straight chain alkylene.

9. A composition of claim 1, further comprising structural units represented by Formula D, and optionally Formulas E and F:

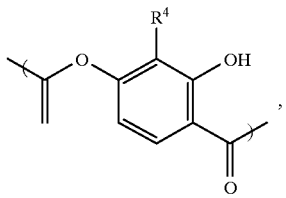

Formula D

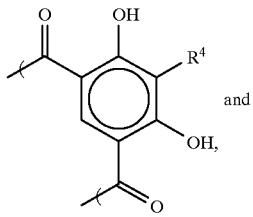

Formula E and

Formula F

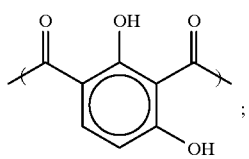

wherein:

R⁴ represents H, $C_{1-8}$ straight chain alkyl, or $C_{4-8}$ branched alkyl.

10. A composition of claim 9 wherein the molar ratio of structural units represented by Formula A to structural units represented by Formula D ranges from about 99:1 to about 1:1.

11. A composition of claim 10 wherein the molar ratio of structural units represented by Formula A to the structural units represented by Formula D ranges from about 99:1 to about 80:20.

12. A composition of claim 9 wherein at least 40 mole percent of Formula B comprises 1,3-phenylene and the remaining being 1,4-phenylene.

13. A composition of claim 9 wherein $R^1$ represents $C_{3-20}$ straight chain alkylene, or $C_5$–$C_6$ cyclo alkylene.

14. A composition of claim 13 wherein $R^1$ represents $C_6$-cyclo alkylene.

15. A composition of claim 13 wherein $R^1$ represents $C_{3-10}$ straight chain alkylene.

16. A weatherable polyester soft block copolymer composition comprising structural units of Formulas A, B, and C:

Formula A

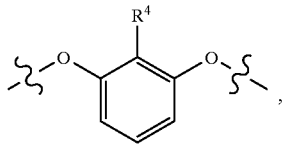

Formula B

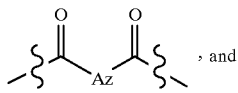

Formula C

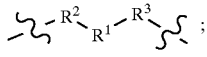

wherein $R^1$ represents $C_{3-10}$ straight chain alkylene or $C_6$ cycloalkylene;

$R^2$ represents

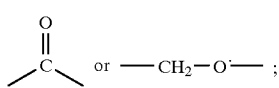

$R^3$ represents

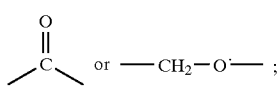

$R^4$ represents H, or $CH_3$; and

Z represents at least one of 1,3-phenylene, 1,4-phenylene, and 2,6-naphthylene;

wherein Formula B comprises at least about 40 mole percent 1,3-phenylene, and Formula C contributes from about 5 to about 20 mole percent to ester linkages of the polyester.

17. A composition of claim 16, further comprising structural units represented by Formula D, and optionally Formulas E and F:

Formula D

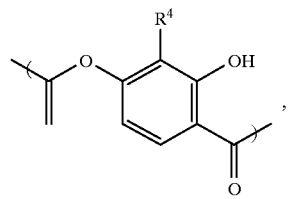

Formula E

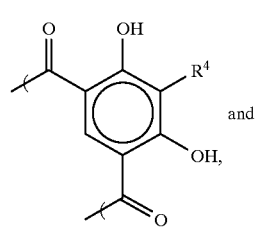

Formula F

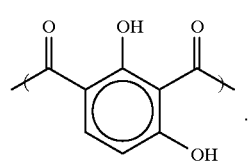

18. A weatherable polyester soft block copolymer composition comprising structural units of Formulas A, B, C, D, and optionally Formulas E and F:

Formula A

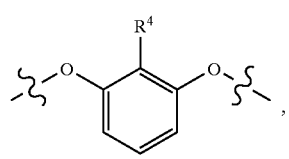

Formula B

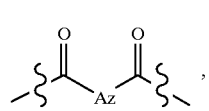

Formula C

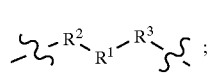

Formula D

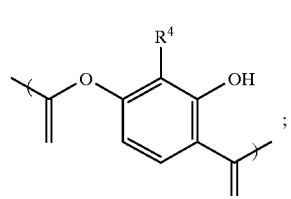

-continued

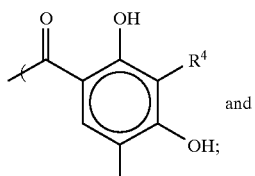

Formula E and

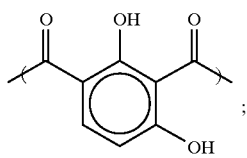

Formula F wherein R¹ represents $C_{3-10}$ straight chain alkylene or $C_6$ cycloalkylene;

R² represents

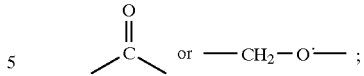

R³ represents

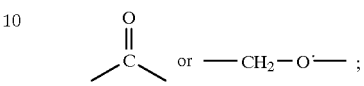

R⁴ represents H, or $CH_3$; and

Z represents at least one of 1,3-phenylene, 1,4-phenylene, and 2,6-naphthylene;

wherein Formula B comprises at least about 40 mole percent 1,3-phenylene, and Formula C contributes from about 5 to about 20 mole percent to ester linkages of the polyester.

* * * * *

UNITED STATES PATENT AND TRADEMARK OFFICE
CERTIFICATE OF CORRECTION

PATENT NO.   : 5,916,997
DATED        : June 29, 1999
INVENTOR(S)  : Jimmy Lynn Webb et al.

It is certified that error appears in the above-identified patent and that said Letters Patent is hereby corrected as shown below:

Title page,
Item [75], Inventors, the name of joint inventor "Tiberiu Mircca Siclovan" should read -- Tiberiu Mircea Siclovan --
Item [57], ABSTRACT,
Line 3, the phrase "and a aliphatic" should read -- an aliphatic --.

Column 1,
Line 54, the phrase "On addition" should read -- In addition --.

Column 3,
Line 15, Formula D which reads

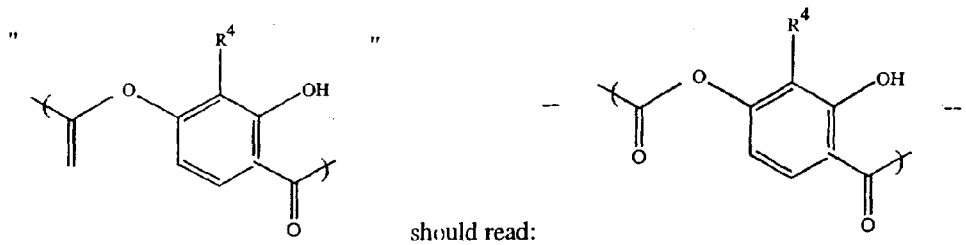

Line 55, the phrase "Formula ID" should read -- Formula D --.

Column 4,
Line 49, the word "while" should read -- white --.

Column 6,
Lines 36-37, (Table 1A, column 3), the phrase "naphthalene-dicatboxylate" should read -- naphthalene-dicarboxylate --.
Line 40, (Table 1A, column 1), the Entry number "28*" should read -- 27* --.

Column 8,
Line 53, Formula D which reads

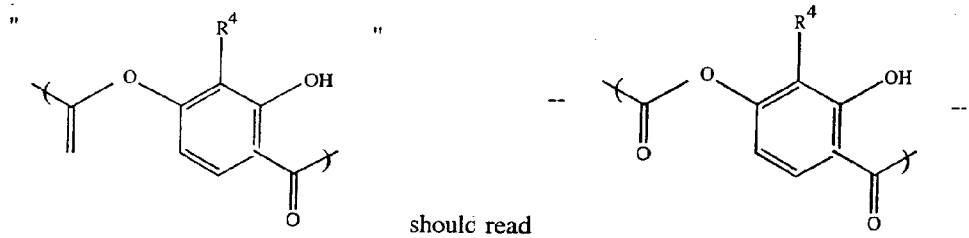

UNITED STATES PATENT AND TRADEMARK OFFICE
CERTIFICATE OF CORRECTION

PATENT NO. : 5,916,997
DATED : June 29, 1999
INVENTOR(S) : Jimmy Lynn Webb et al.

It is certified that error appears in the above-identified patent and that said Letters Patent is hereby corrected as shown below:

Column 9,
Line 43, Formula B which reads

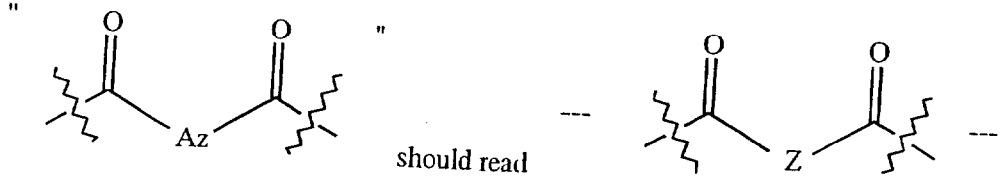

Column 10,
Line 14, Formula D which reads

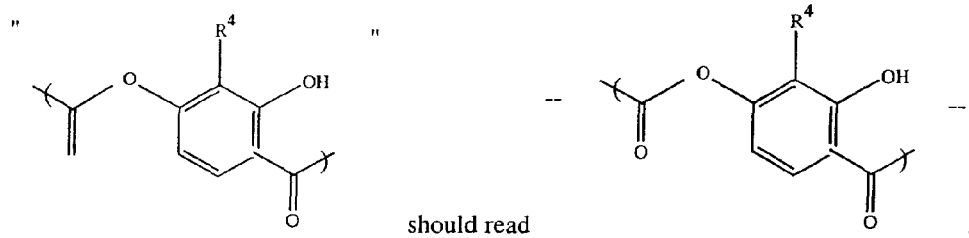

Line 52, Formula B which reads

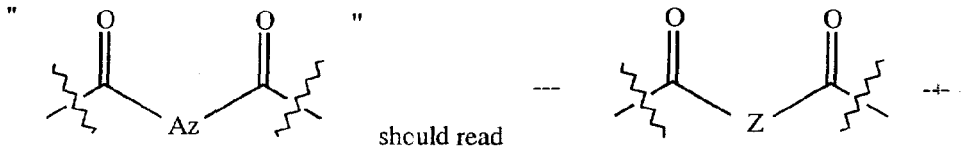

UNITED STATES PATENT AND TRADEMARK OFFICE
CERTIFICATE OF CORRECTION

PATENT NO. : 5,916,997
DATED : June 29, 1999
INVENTOR(S) : Jimmy Lynn Webb et al.

It is certified that error appears in the above-identified patent and that said Letters Patent is hereby corrected as shown below:

Column 10 cont'd.
Line 60, Formula D which reads

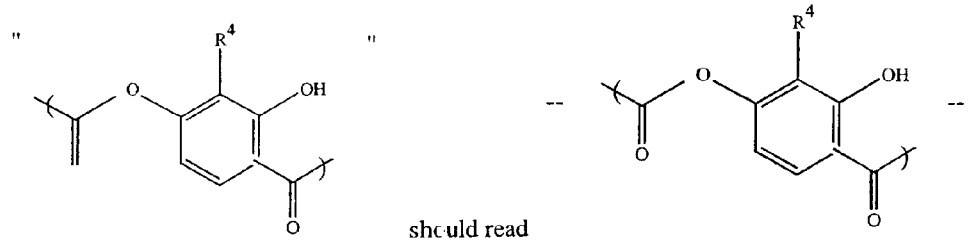

should read

Signed and Sealed this

Twelfth Day of November, 2002

*Attest:*

JAMES E. ROGAN
*Attesting Officer*     *Director of the United States Patent and Trademark Office*